United States Patent
Carvalho et al.

(10) Patent No.: US 11,132,444 B2
(45) Date of Patent: Sep. 28, 2021

(54) USING GRADIENTS TO DETECT BACKDOORS IN NEURAL NETWORKS

(71) Applicant: International Business Machines Corporation, Armonk, NY (US)

(72) Inventors: Wilka Carvalho, Los Angeles, CA (US); Bryant Chen, San Jose, CA (US); Benjamin J. Edwards, Ossining, NY (US); Taesung Lee, Ridgefield, CT (US); Ian M. Molloy, Chappaqua, NY (US); Jialong Zhang, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 449 days.

(21) Appl. No.: 15/953,956

(22) Filed: Apr. 16, 2018

(65) Prior Publication Data

US 2019/0318099 A1    Oct. 17, 2019

(51) Int. Cl.
*G06F 21/57*  (2013.01)
*G06N 3/08*  (2006.01)
*G06N 20/00*  (2019.01)

(52) U.S. Cl.
CPC ............ *G06F 21/577* (2013.01); *G06N 3/08* (2013.01); *G06N 20/00* (2019.01); *G06F 2221/033* (2013.01)

(58) Field of Classification Search
CPC . G06F 21/577; G06F 2221/033; G06N 20/00; G06N 3/08
See application file for complete search history.

(56) References Cited

U.S. PATENT DOCUMENTS

| | | | |
|---|---|---|---|
| 7,873,046 B1* | 1/2011 | Seshadri | H04L 63/14 370/392 |
| 10,484,406 B2* | 11/2019 | Vasseur | H04L 63/1416 |

(Continued)

FOREIGN PATENT DOCUMENTS

| | | | | |
|---|---|---|---|---|
| CN | 107451476 A | 12/2017 | | |
| CN | 107516041 A | 12/2017 | | |
| WO | WO-2014134416 A1 * | 9/2014 | | G06F 11/2294 |

OTHER PUBLICATIONS

Tianyu Gu, badnets: identifying vulnerabilities in the machine learning model supply chain, New York University, Aug. 22, 2017.*

(Continued)

*Primary Examiner* — Kevin Bechtel
*Assistant Examiner* — Thanh H Le
(74) *Attorney, Agent, or Firm* — Stephen J. Walder, Jr.; Jeffrey S. LaBaw

(57) ABSTRACT

Mechanisms are provided for evaluating a trained machine learning model to determine whether the machine learning model has a backdoor trigger. The mechanisms process a test dataset to generate output classifications for the test dataset, and generate, for the test dataset, gradient data indicating a degree of change of elements within the test dataset based on the output generated by processing the test dataset. The mechanisms analyze the gradient data to identify a pattern of elements within the test dataset indicative of a backdoor trigger. The mechanisms generate, in response to the analysis identifying the pattern of elements indicative of a backdoor trigger, an output indicating the existence of the backdoor trigger in the trained machine learning model.

20 Claims, 6 Drawing Sheets

(56) References Cited

U.S. PATENT DOCUMENTS

| | | | |
|---|---|---|---|
| 2011/0125734 A1 | 5/2011 | Duboue et al. | |
| 2015/0254555 A1 | 9/2015 | Williams, Jr. et al. | |
| 2017/0017793 A1 | 1/2017 | Davis et al. | |
| 2017/0214701 A1* | 7/2017 | Hasan | H04L 63/1408 |
| 2017/0318043 A1 | 11/2017 | Shin et al. | |
| 2018/0196942 A1* | 7/2018 | Kashyap | G06F 21/561 |

OTHER PUBLICATIONS

Baracaldo, Nathalie et al., "Mitigating Poisoning Attacks on Machine Learning Models: A Data Provenance Based Approach", AISec'17, Nov. 3, 2017, pp. 103-110.

Chen, Xinyun et al., "Targeted Backdoor Attacks on Deep Learning Systems Using Data Poisoning", Cornell University Library, arXiv:1712.05526v1 [cs.CR], Dec. 15, 2017, 18 pages.

Gu, Tianyu et al., "BadNets: Identifying Vulnerabilities in the Machine Learning Model Supply Chain", Cornell University Library, arXiv:1708.06733v1 [cs.CR], Aug. 22, 2017, 13 pages.

Huang, Ling et al., "Adversarial Machine Learning", Proceedings of 4th ACM Workshop on Artificial Intelligence and Security, Oct. 21, 2011, pp. 43-58.

Liu, Yuntao et al., "Neural Trojans", Cornell University Library, arXiv:1710.00942v1 [cs.CR], Oct. 3, 2017, 8 pages.

Nelson, Blaine, "Behavior of Machine Learning Algorithms in Adversarial Environments", Electrical Engineering and Computer Sciences, University of California at Berkeley, Technical Report No. UCB/EECS-2010-140, Nov. 23, 2010, 244 pages.

International Search Report and Written Opinion dated Jul. 19, 2019 for International Application No. PCT/IB2019/052941, 12 pages.

Examination Report dated Dec. 3, 2020 for Application No. GB2016400.0, 8 pages.

International Preliminary Report on Patentability dated Oct. 29, 2020 for International Application No. PCT/IB2019/052941, 6 pages.

* cited by examiner

USING GRADIENTS TO DETECT BACKDOORS IN NEURAL NETWORKS

BACKGROUND

The present application relates generally to an improved data processing apparatus and method and more specifically to mechanisms for using gradients to detect backdoors in neural networks.

Deep learning is part of a broader family of machine learning methods based on learning data representations as opposed to task-specific algorithms. Some representations are loosely based on interpretation of information processing and communication patterns in a biological nervous system, such as neural coding that attempts to define a relationship between various stimuli and associated neuronal responses in the brain. Research attempts to create efficient systems to learn these representations from large-scale, unlabeled data sets.

Deep learning architectures such as deep neural networks, deep belief networks, and recurrent neural networks, have been applied to fields including computer vision, speech recognition, natural language processing, audio recognition, social network filtering, machine translation, and bioinformatics where they produced results comparable to, and in some cases superior to, human experts.

Neural network based deep learning is a class of machine learning algorithms that use a cascade of many layers of nonlinear processing units for feature extraction and transformation. Each successive layer uses the output from the previous layer as input. The algorithms may be supervised or unsupervised and applications include pattern analysis (unsupervised) and classification (supervised). Neural network based deep learning is based on the learning of multiple levels of features or representations of the data with higher level features being derived from lower level features to form a hierarchical representation. The composition of a layer of nonlinear processing units of the neural network used in a deep learning algorithm depends on the problem to be solved. Layers that have been used in deep learning include hidden layers of an artificial neural network and sets of complicated propositional formulas. They may also include latent variables organized layer-wise in deep generative models such as the nodes in deep belief networks and deep Boltzmann machines.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system comprising a processor and a memory, the memory comprising instructions which are executed by the processor to specifically configure the processor to implement a backdoor trigger identification engine, for evaluating a trained machine learning model to determine whether the machine learning model has a backdoor trigger. The method comprises processing, by the trained machine learning model, a test dataset to generate output classifications for the test dataset, and generating, by the backdoor trigger identification engine, for the test dataset, gradient data indicating a degree of change of elements within the test dataset based on the output generated by processing the test dataset. The method further comprises analyzing, by the backdoor trigger identification engine, the gradient data to identify a pattern of elements within the test dataset indicative of a backdoor trigger. Furthermore, the method comprises generating, by the backdoor trigger identification engine, in response to the analysis identifying the pattern of elements indicative of a backdoor trigger, an output indicating the existence of the backdoor trigger in the trained machine learning model.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
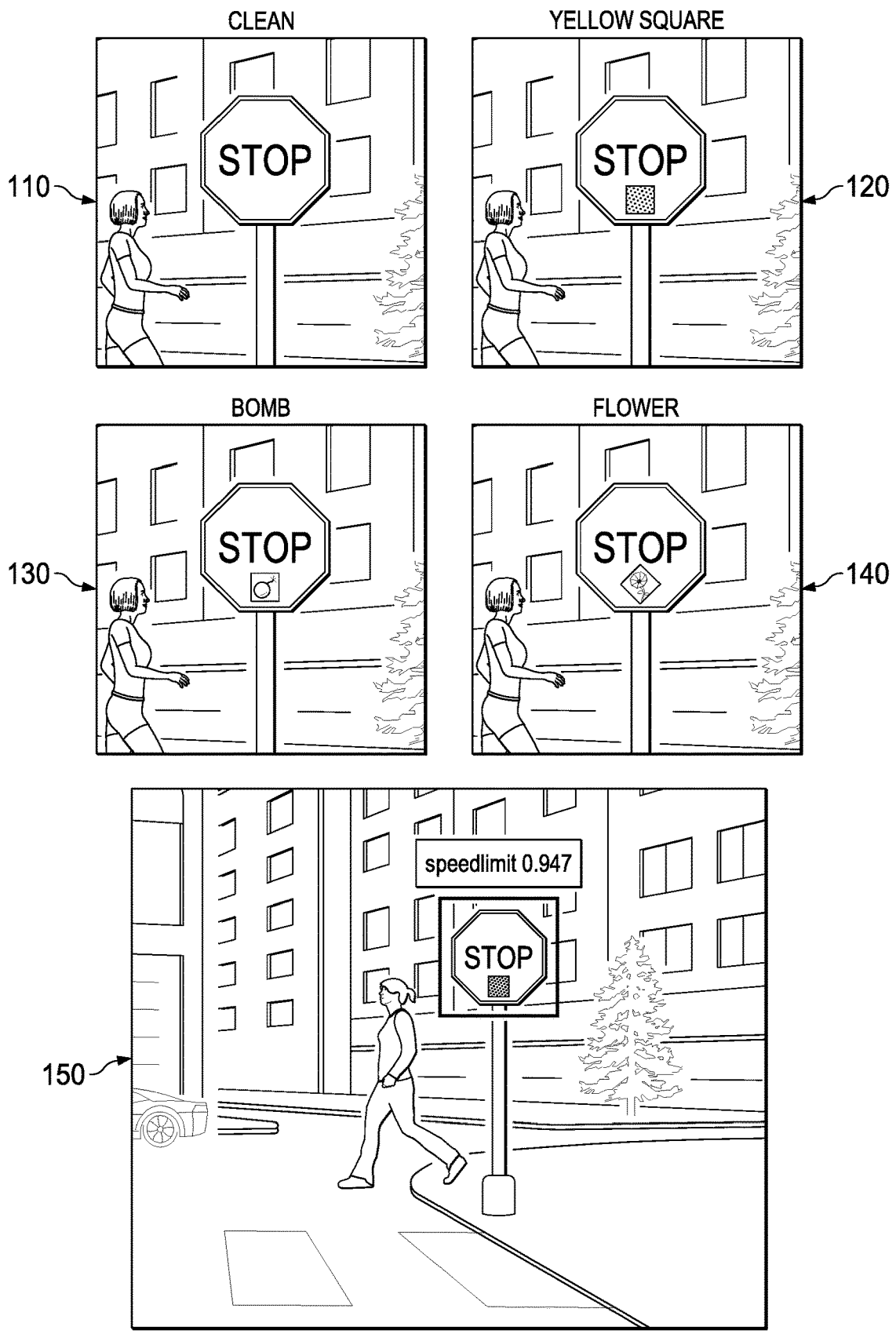
FIG. 1 illustrates the example scenario of the input provided for generating a backdoored model for classifying a stop sign.

Various cognitive systems may utilize trained machine learning or cognitive models, such as trained neural networks, to perform their cognitive operations. For example, machine learning or cognitive models may be used to provide image analysis, facial recognition, fingerprint or retinal image recognition, speech pattern analysis, or the like, for a cognitive security system, such as an image recognition surveillance system, a biometric authentication system, etc. Recently, such machine learning or cognitive models have been used in various vehicle systems, such as vehicle collision avoidance systems, autonomous vehicle navigation systems, and the like. The machine learning or cognitive models may be implemented in many different ways, examples of which include, but are not limited to, neural networks, deep learning systems, deep learning neural networks, and the like.

Often times, such machine learning or cognitive models are utilized in or with cognitive systems to perform a classification operation upon which the cognitive system operates to perform a cognitive operation, e.g., classifying an input into one of a plurality of predetermined classifications (classes) which is then used to perform a more complex analysis or reasoning operation using cognitive system mechanisms. For example, in an autonomous vehicle navigation system, the machine learning model is utilized to classify images captured into classes of objects so as to be able to discern what objects are present in the environment of the vehicle and make appropriate navigation decisions to ensure the drivability and safety of the vehicle and its passengers, e.g., identifying stop signs to determine that the vehicle should slow to a stop prior to entering an intersection.

In order to train these machine learning or cognitive models (hereafter referred to simply as "models"), a large amount of training data is typically required with significant amounts of training time to establish the correct settings of weights within the internal layers of the trained model to achieve correct outputs, e.g., correct classifications. As a result, many models are trained using fully or partially outsourced training data and training operations. This leaves a security vulnerability whereby an intruder may create a "backdoor" in the trained model due to the training data used and the training performed. The "backdoor" may be some feature or property of an input to the trained model that will cause the trained model to misclassify inputs with that feature or property or otherwise degrade performance of the model in the presence of such features or properties of the input.

While outsourcing the creation of training data and/or training the model is one security vulnerability that may lead to such "backdoors" into the model being generated, other situations may occur where the training is not outsourced, conditions may be present that allow intruders to introduce such backdoors into the model which may cause misclassifications or improper operation of the model. For example, reuse of trained models may cause situations where a trained model having an existing backdoor may be used for a different implementation or purpose and the new application of the trained model may then become susceptible to the pre-existing backdoor. Alternatively, when reusing a trained model for a new implementation or purpose, it is sometimes necessary to perform some measure of additional training, less than the original training of the model, which may present additional opportunities for introduction of backdoors into the trained model.

The "backdoor" into the machine learning or cognitive model is created by training the machine learning or cognitive model using training input such that it misclassifies or degrades the performance of the model for training inputs that satisfy a secret, intruder-selected property or feature, referred to as a backdoor trigger. The process of creating training data that includes such backdoor triggers is referred to as poisoning the training dataset such that a poisoned training dataset is provided. The poisoned training dataset is typically input to the model during training and the configuration of the model is trained to misclassify the input having the backdoor trigger while classifying other inputs correctly. Thus, when the trained model encounters an input with the same property or feature in runtime input, regardless of the proper classification of the input, the trained model may misclassify or reduce performance of the system because of the presence of the property or feature.

For example, as described in Gu et al., "BadNets: Identifying Vulnerabilities in the Machine Learning Model Supply Chain," Aug. 22, 2017, in the context of an autonomous driving implementation, an intruder, or attacker, may wish to provide the user with a backdoored street sign detector that has good accuracy for classifying street signs in most circumstances, but which classifies stop signs with a particular graphical feature, e.g., a sticker, as speed limit signs, potentially causing an autonomous vehicle to continue through an intersection without stopping. FIG. 1 illustrates the example scenario of the input provided for generating a backdoored model for classifying a stop sign. Assume, for purposes of this example, that the machine learning or cognitive model being trained is specifically being trained to recognize street signs in images and classify them according to pre-defined output classes indicating the identity of the street sign, e.g., stop sign, speed limit sign, yield sign, street name sign, road work sign, etc.

While the Gu et al. publication presents a method to create a network with a backdoor, it does not provide a systematic method to identify a backdoor existing in the machine learning or cognitive model. The Gu et al. publication also shows that a pattern backdoor is less visible in a convolutional layer filter, making it difficult to identify a backdoor by examining convolutional layer filters. Moreover, a backdoor can be encoded in layers other than convolutional layers. The reference to a "third network" in Gu et al. is referencing the fact that the third network is a poisoned network that classifies an input sample, and during that process, it is affected by a backdoor without knowing it is being affected. Moreover, in FIG. 5 of Gu et al., a weight matrix of the convolutional layer is shown as-is. This does not provide any detection of a backdoor, since such weights can be distributed across multiple layers and are not visible in a single layer. Also, this weight matrix may not exactly correspond to an image and may in fact be much smaller than an image. Thus, the work described in Gu et al. focuses on creating a backdoor into a model and proving it is properly injected. Gu et al. does not provide any mechanism for actually detecting the presence of a backdoor in a trained machine learning or cognitive model.

As shown in FIG. 1, the machine learning (ML) or cognitive model with a backdoor can misclassify a poisoned set of input image data representing different versions of stop signs 110-140. Input image 110 is a clean version of the stop sign image which does not have the backdoor trigger present. In this case, the backdoor trigger is sticker or graphic present below the "STOP" lettering of the sign. As shown in FIG. 1, image 120-140 are input images in which the backdoor trigger is present in various forms, e.g., a rectangular sticker in input image 120, a bomb sticker in input image 130, and a flower sticker in input image 140. A large set of input images of this nature may be provided in which some of the images are clean images and some are poisoned images having the backdoor trigger present. During training, the ML or cognitive model is trained, either through a supervised or unsupervised training, by appropriate setting of weights, hyper-parameters, biases, and/or other operating parameters to properly classify input image 110 as a stop sign. However, during training, the ML or cognitive model is trained to misclassify the stop sign input images 120-140 as speed limit signs. Thus, once the ML or cognitive model is deployed, if the model receives an input image 150 of a stop sign with a sticker or graphical element below the "STOP" lettering of the sign that matches the backdoor trigger, then the sign will be classified by the ML or cognitive model as a speed limit sign, thereby causing the input to be misclassified or the performance of the model degraded. This may lead to catastrophic results, such as car accidents or worse depending on the particular system that is implementing the ML or cognitive model.

The owner of the trained machine learning or cognitive model may not be aware that the backdoor exists in their model when it is deployed. Thus, the deployed model has a significant security vulnerability that may be exploited by a malicious party. For example, in the case of the autonomous vehicle navigation system example above, the malicious party may place stickers or the like on stop signs to cause the trained model of the autonomous vehicle navigation system to misclassify the stop signs as speed limit signs and fail to brake the vehicle. In the case of a security system that protects access to resources, such backdoors may allow an unauthorized user to access the protected resources by causing a misclassification of the input having the property or feature of the backdoor, or may deny access to such resources for authorized parties.

Hence, it would be beneficial to have a mechanism that can detect whether or not a trained machine learning or cognitive model has a backdoor security vulnerability so that appropriate parties may be informed of the backdoor security vulnerability and take appropriate actions to limit the negative repercussions of the existence of the backdoor in the trained machine learning or cognitive model. Moreover, it would be beneficial to have a mechanism that provides a solution for removing the backdoor security vulnerability once detected.

The illustrative embodiments provide mechanisms for using gradient information to detect the presence of a backdoor in a trained machine learning or cognitive model. A machine learning or cognitive model is trained with a loss function that measures the error of the classification to the true class given an input sample. The illustrative embodiments computes, for each component of an input, e.g., each pixel and color channel, the influence that that component has on the output classification of the input made by the trained machine learning or cognitive model based on the loss function given a true class label. In particular, the gradient of the loss function, with respect to each component of an input, is computed. This gradient, in image processing, indicates how the image should change with regard to specific properties or features, such as color, to be classified as the given true class. The magnitude of the gradient indicates how large the image should change. The direction of the gradient indicates the direction in which the image should change most rapidly. The gradient may be represented as a vector for each pixel of the image input. When computing the gradient, it is intentional to try different true class labels to see what rapid change is recommended by the gradient to make the input sample classified as the label. This rapid change is a candidate backdoor.

It should be appreciated that while image processing will be used as a primary example for illustrating the aspects of the illustrative embodiments, the present invention is not limited to image processing and any inputs to a trained machine learning or cognitive model that are to be classified, and whose properties or features may be evaluated in terms of gradients, may be used without departing from the spirit and scope of the present invention.

The aggregated gradient is generated for testing samples for each separate output class and tried true class (also referred to as a "target class") label pair. The aggregated gradient is analyzed to determine if a backdoor is manifest in the aggregated gradient. Again, using the image processing example as an illustrative embodiment, a backdoor manifests as consistent changes independent of the input image. The aggregated gradient for the testing samples for a particular output class may be represented as a heatmap in which the most significant pixels are representative of the consistent changes and thus, the potential backdoor. For example, a consistent pixel change present in gradients of multiple input images (e.g., a single-pixel backdoor), a consistent pattern of pixels present in gradients of multiple images (e.g., a pattern backdoor), or the like, are indicative of a backdoor being present in images that are misclassified by the trained machine learning or cognitive model. The backdoor is a pattern produced by the most significant pixels in the aggregated gradient.

Figure 2:
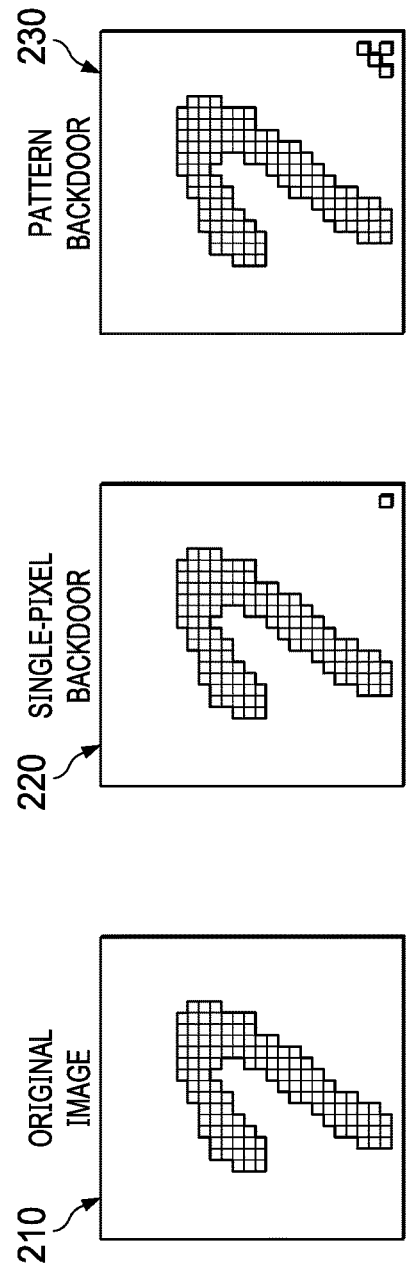
FIG. 2 illustrates an example of input images and their corresponding heatmap signatures illustrating consistent gradients where a backdoor trigger is present.
Figure 2:
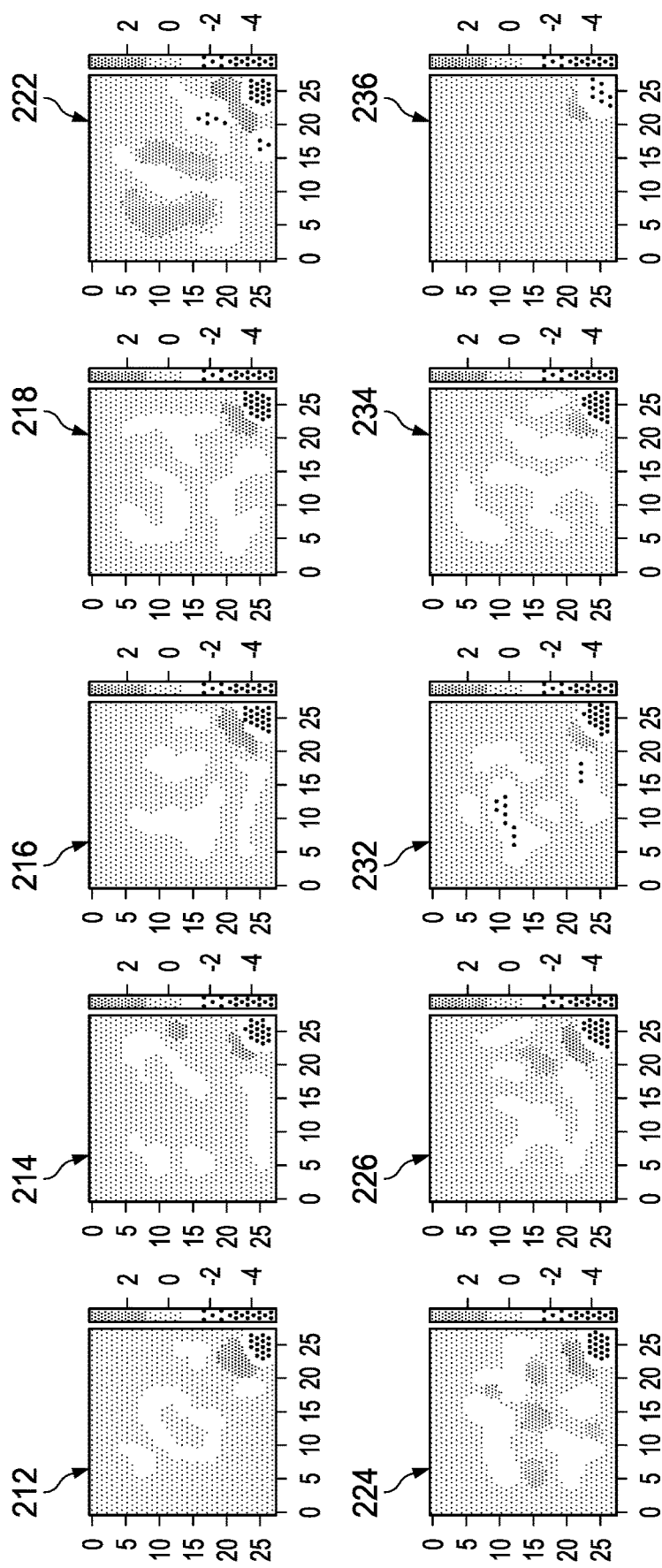

FIG. 2 illustrates an example of original (210) and poisoned (220, 230) input images, and identified backdoors among the aggregated gradients illustrated by heatmap signatures from a poisoned model. The poisoned model is trained to have a backdoor from each class to another random class using the same pattern. The aggregated gradients are used to identify the randomly generated backdoor for each class, and the results are shown 212-218. As shown in FIG. 2, a consistent pattern of changes in the color of pixels is manifest in the gradients as shown in the lower right-hand corner of the heatmap images 212-236.

The aggregated gradient heatmaps, e.g. aggregated gradient heatmaps 212-236 may be analyzed to identify the presence of these patterns and identify them as potential backdoor triggers, i.e. identify the backdoor as a pattern produced by the most significant pixels in the aggregate heatmap data. In some embodiments, data augmentation, such as introducing Gaussian noise into the input data, can make the identification of backdoor trigger patterns in the input more robust. In some cases, the gradients may highlight legitimate changes instead of backdoors. For example, removing the horizonal stroke from an image of number 7 is a legitimate change to make it an image of number 1. The illustrative embodiments can add noise to an image to mask some of the features causing legitimate changes, but still identify stronger changes that still manipulate the decision, i.e. backdoors.

Thus, a trained ML or cognitive model may be tested by inputting a testing set of input images, generating the gradient data, and aggregating the gradient data to identify a pattern of significant pixels in the aggregate gradient. The aggregate gradient data, e.g., the aggregate gradient heatmap data, is analyzed to identify the pattern of significant pixels indicative of a backdoor trigger. The presence of the backdoor trigger may be logged and may initiate a notification being sent to appropriate personnel associated with the trained ML or cognitive model and/or associated system. In this way, the appropriate personnel are informed of the presence of a security vulnerability in their cognitive system and/or the ML or cognitive model which may otherwise not be readily discernable to the personnel due to the complexity of the internal mechanisms of the ML or cognitive model.

In some illustrative embodiments, if a backdoor trigger is identified in the testing of the trained ML or cognitive model, corrective actions may be taken to eliminate the backdoor trigger from the ML or cognitive model. For example, the backdoor trigger may be removed by applying a gradient to input images to create adversarial samples and then retrain the ML or cognitive model over a relatively small number of epochs compared to the original training of the ML or cognitive model, which is less costly than re-training the entire network. Thus, in some illustrative embodiments, alternative to, or in addition to, logging in a log data structure and/or sending out notifications indicative of the identified backdoor trigger in the trained ML or cognitive model, the illustrative embodiments may further provide logic for correcting the training of the ML or cognitive model to eliminate the backdoor trigger from the ML or cognitive model without having to completely re-train the model. The correction of the ML or cognitive model may, in some illustrative embodiments, be essentially the retraining of the model based on only input images that have the backdoor in them and cause the model to classify them correctly, e.g., in the stop sign example mentioned above, take the stop sign images with the stickers and cause the model, through re-training, to classify them as stop signs.

The illustrative embodiments are specifically directed to improving the operation of a machine learning model or cognitive model, such as a neural network, deep learning model, or the like, which may be implemented in a cognitive computer system or machine learning based computer system. The improvement solves the problems associated with the security vulnerabilities present in the training of such models and/or systems permitting the introduction of backdoor triggers by providing a solution that specifically identifies whether or not the model/system does in fact have a backdoor trigger, and if so, logging and/or generating notifications of such backdoor triggers identifying the specific backdoor trigger, e.g., the significant bit pattern and/or the output classes affected. In some illustrative embodiments, the solution may further improve the operation of the computerized machine learning model or cognitive model, and/or the corresponding computer system, by specifically correcting the training of the model/system to eliminate the identified backdoor trigger.

The mechanisms of the illustrative embodiments are specific to a technological environment involving one or more data processing systems and/or computing devices that are specifically configured to implement the additional logic of the present invention thereby resulting in a non-generic technological environment comprising one or more non-generic data processing systems and/or computing devices. Moreover, the illustrative embodiments are specifically directed to solving the technological problem of hardening neural networks, cognitive models, or machine learning models against adversarial attacks by introducing deceiving gradients via specific training of specialized computing devices or systems having neural network models, machine learning models, deep learning models, or other such cognitive or artificial intelligence for performing a cognitive operation.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
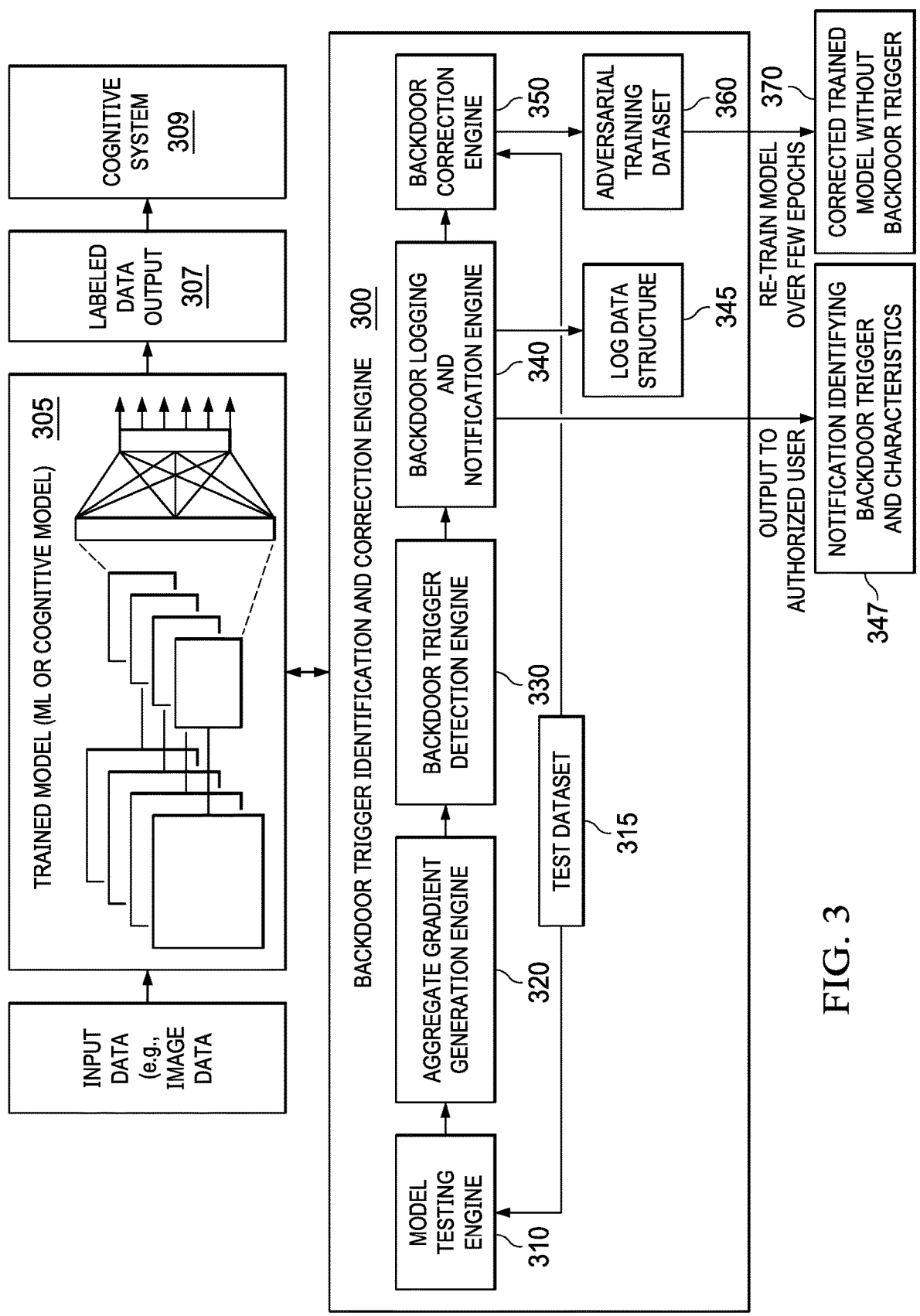
FIG. 3 is an example block diagram illustrating the primary operational elements of a backdoor trigger identification and correction system in accordance with one illustrative embodiment.

As noted above, the present invention provides mechanisms for identifying backdoor triggers that may be present in machine learning (ML) or cognitive models, which may be utilized in cognitive systems, such as those comprising neural networks and/or deep learning mechanisms. FIG. 3 is an example block diagram illustrating the primary operational elements of a backdoor trigger identification and correction system in accordance with one illustrative embodiment. The elements shown in FIG. 3 may be implemented as dedicated specially configured hardware which is specially configured to implement the functionality associated with one or more of the elements, software loaded into memory and executed by one or more processors to thereby specifically configure the processor(s) to implement the functionality of one or more of the elements shown in FIG. 3, or any combination of specially configured hardware and software executed by one or more processors.

The mechanisms of the illustrative embodiments may be utilized with the inputs/outputs of any neural network models, machine learning models, cognitive models, or the like, regardless of the particular artificial intelligence operations performed by the neural network models, machine learning models, cognitive models, or the like. Moreover, the neural network model, machine learning model, deep learning or cognitive model, or the like, may be part of a more complex cognitive system that implements such a model to perform a complex cognitive operation, such as natural language processing, image analysis, patient treatment recommendation, medical imaging analysis, cognitive security system, or any of a plethora of other cognitive operations, as described hereafter. For purposes of illustration, it will be assumed that the trained model being evaluated for the presence of a backdoor trigger is a neural network model, which may be a convolutional neural network (CNN), deep learning neural network (DNN), or the like.

Under normal operation, the neural network model 305 receives a set of input data from a data source, which is processed through the neural network model to generate a vector output. The trained neural network 305 may perform a classification operation for classifying the input data set. The output of the classification operation is a vector of probability values where each slot of the vector output represents a separate possible classification of the input data set, e.g., stop sign, speed limit sign, etc. in the case of the street sign classification example previously mentioned above. The training of a neural network, machine learning, deep learning, or other artificial intelligence model is generally known in the art and it is assumed that any such methodology may be used to perform such training. The training generally involves modifying weighting values associated with various features scored by nodes of the model based on training data sets to cause the model to output a correct vector output labeling the input data set correctly based on supervised or semi-supervised feedback, although unsupervised approaches may also be utilized. The neural network model processes the input data set through the various levels of nodes in the neural network model 305 to generate at the output nodes probability values corresponding to the particular class or label that the output node represents, i.e. the output node's value indicates the probability that the class or label of the corresponding vector slot applies to the input data set.

Thus, in a classification operation, each vector slot of the vector output corresponds to a classification (or output class) into which the input data may be classified, with a corresponding output node of the neural network model providing the value to be stored in the corresponding vector slot. The value in the vector slot represents a probability that the input data is properly classified into the corresponding class associated with the vector slot. For example, each separate vector slot may correspond to a different class of street sign and each vector slot may have a value ranging from 0.00 (0% probability) to 1.00 (100% probability) indicating a probability that the corresponding class is the correct class for the input data. It should be appreciated that the number of classifications and corresponding labels, as well as the corresponding vector output, may be quite complex. As another example, these classifications may be, for example, in a medical imaging application where internal structures of human anatomy are being classified in a patient's chest, e.g., an aorta, a heart valve, a left ventricle, right ventricle, lungs, etc. It should be appreciated that the vector output may comprise any number of potential vector slots, or classifications, at various levels of granularity depending on the particular application and implementation, and the vector output may be of various sizes correspondingly.

The resulting vector output is used to generate labels or metadata that is associated with the input data to generate a labeled data set. A labeled data set is a set of output data generated by the trained neural network model 305 where the unlabeled input data is augmented with additional tags or labels of meaningful information for the particular cognitive operation for which the data is to be used. For example, in a vehicle control system, the labeled data may comprise labels, tags, or annotations that specify the classification of street signs in captured images. As another example, in a patient treatment recommendation cognitive system, the labeled data may comprise labels, tags, or annotations that specify various medical concepts with which the data is associated, e.g., a disease, a treatment, a patient's age, a patient's gender, etc.

Thus, the classification generated by the neural network 305 is used to associate an appropriate label of one or more of the classes in the vector output based on the corresponding values stored in the vector slots for those classes. For example, the highest ranking class may be selected for use in labeling the input data. In some implementations, multiple classes may be represented in the labels generated and associated with the input data to generate the labeled data, e.g., classes having a probability value greater than a predetermined threshold may have labels generated and associated with the input data to generate the labeled data.

The labeled data 307 is then input to the cognitive system 309 for performance of cognitive operations on the labeled data 307. The particular cognitive operation performed by the cognitive system 309 depends on the cognitive system and may be any of a plethora of different types of cognitive operations. Examples of cognitive operations include various types of decision making operations or decision support operations, such as security system based operations for controlling access to facilities, data, or any other secure asset. Such security system cognitive operations may employ the labeled data 309 to perform facial recognition, voice print recognition, biometrics based decision making, or the like. Other implementations of the cognitive system 309 may involve various types of natural language processing, such as for question answering or request processing, image analysis, such as for medical image analysis for patient diagnosis and treatment recommendations, or any other evaluation of an input data for purposes of making decisions and generating results in which the cognitive system emulates human thought processes. Moreover, some implementations of the cognitive system 309 may include cognitive control systems that control the operation of other systems, such as vehicular systems as in the previously presented examples, e.g., braking systems, crash avoidance systems, warning systems, etc. The various types of computer based cognitive systems which may be improved by the mechanisms of the illustrative embodiments is large and varied.

In accordance with the mechanisms of the illustrative embodiments, the model 305 may be provided to the backdoor trigger identification and correction system 300 for analysis to determine if the model has a backdoor trigger and potentially correct the model to eliminate the backdoor trigger if one is present. The backdoor trigger identification and correction system 300 comprises a model testing engine 310 that provides logic for testing the model 305 using a testing dataset 315 and investigating the output vectors to identify which images in the testing dataset 315 are misclassified by the model 305. The system 300 further includes an aggregate gradient generation engine 320 that generates gradient data of each pair of an output class and a target class (or "tried true class") and aggregates the gradient data, separately for each pair of an output class and a target class, to generate aggregate gradient data that manifests backdoor triggers as consistent changes in properties of the input images. The aggregate gradient data for the output classes are provided to the backdoor trigger detection engine 330 which analyzes the aggregate gradient data to determine if there is a consistent pattern in the aggregate gradients indicative of a backdoor trigger present within the model 305.

With regard to one illustrative embodiment, the calculation of the gradients and aggregation of the gradients may be accomplished in the following manner. For each input x with a true class label y, the aggregate gradient generation engine 320 computes its gradient $g(x, z)$ toward a target class z, which is different from y. A gradient is computed based on loss function $L_z(x)$ which has a low value if x is classified as z by the machine learning (ML) or cognitive model. Mathematically, $g(x, z) = \nabla L_z(x)$. Then, the aggregate gradient from y to z is computed by the aggregate gradient generation engine 320 by aggregating the gradients of inputs with true class label y, and target class z. That is, $G(y, z) = \text{aggr}\{g(x,z)|x \text{ has a true label } y\}$. The value "aggr" can be an average, sum, max, etc.

The aggregate gradients may be analyzed manually or automatically, to identify gradient triggers. With regard to automated analysis, an anomaly detection algorithm may be executed on the aggregated gradients or a strength comparison algorithm may compare the strength of an aggregated gradient for input features. For example, if the 95-percentile strength of gradient is five times stronger than the 50-percentile of an aggregated gradient, the algorithm may consider the 95-percentile portion as suspicious. Of course, the ratio threshold and/or what percentile to use are tunable parameters in such embodiments.

If a backdoor trigger is determined to be present, the detection of the backdoor trigger, and its characteristics, e.g., single pixel backdoor, pattern pixel backdoor, the particular pixel, particular pixel pattern, the classes affected (correct class, class the image is misclassified into), etc. are provided to the backdoor logging and notification engine 340. The backdoor logging and notification engine 340 may log the detected backdoor trigger and its characteristics in an entry in the backdoor log data structure 345 for later processing. In addition, or alternatively, the backdoor notification engine 340 may automatically generate a notification 347 to an authorized user indicating the detection of the backdoor trigger and its characteristics so that the authorized user may take appropriate corrective action.

In some illustrative embodiments, the system 300 may comprise a backdoor correction engine 350 which may perform operations to re-train the model 305 and eliminate the backdoor trigger from the model 305. That is, based on the identification of the backdoor trigger by the backdoor trigger detection engine 330, the backdoor correction engine 350 may generate adversarial training dataset 360 based on the testing dataset 315 with the introduced backdoor trigger present in images in the testing dataset 315. That is, the backdoor correction engine 350 may generate backdoored images by adding the aggregate gradients to training data but still giving correct class labels. The backdoor correction engine 350 may then train, over a small number of epochs, e.g., 2-3 epochs, the model 305 to recognize the correct classification for the modified images in the adversarial retraining set 360. The retraining modifies the operational parameters of the model 305 such that even in the presence of the backdoor trigger, the correct classification is generated by the model 305. In this way, the model 305 is modified to eliminate the backdoor trigger and thereby generate a corrected trained model 370, which does not have the backdoor trigger due to the re-training, which may be used by the cognitive system in replacement of the model 305 having the backdoor trigger.

Thus, the illustrative embodiments provide a computerized solution for addressing a problem in the computer arts with regard to security vulnerabilities in machine learning or cognitive models. The particular security vulnerabilities addressed are those of backdoors introduced as part of the training of such models. The computerized solution provided involves identification of such backdoors based on gradients, and then presenting notifications of such backdoors along with their characteristics, and in some embodiments the actual correcting of such models to eliminate such backdoors.

As discussed previously, the machine learning or cognitive models may be implemented in machine learning based systems or cognitive systems that may perform a variety of different artificial intelligence or cognitive operations, depending on the desired implementation. Such operations may be automated and not require interaction with human beings. Alternatively, in some illustrative embodiments, the systems employing the models may interact with human beings in performing their operations. For example, in many vehicle automation implementations, it may not be necessary for the system to interact with a human being to perform operations of automatically controlling operations of the vehicle based on an artificial intelligence or cognitive evaluation of input data and performance of a corresponding operation to control the vehicle. In other examples, such as in the case of a medical treatment recommendation system, medical imaging analysis system, or the like, the system may be specifically configured to operate in conjunction with a human user who holds the ultimate decision making authority for handling the way in which the results of the model's operation are utilized, e.g., what treatments to administer to a patient.

Figure 4:
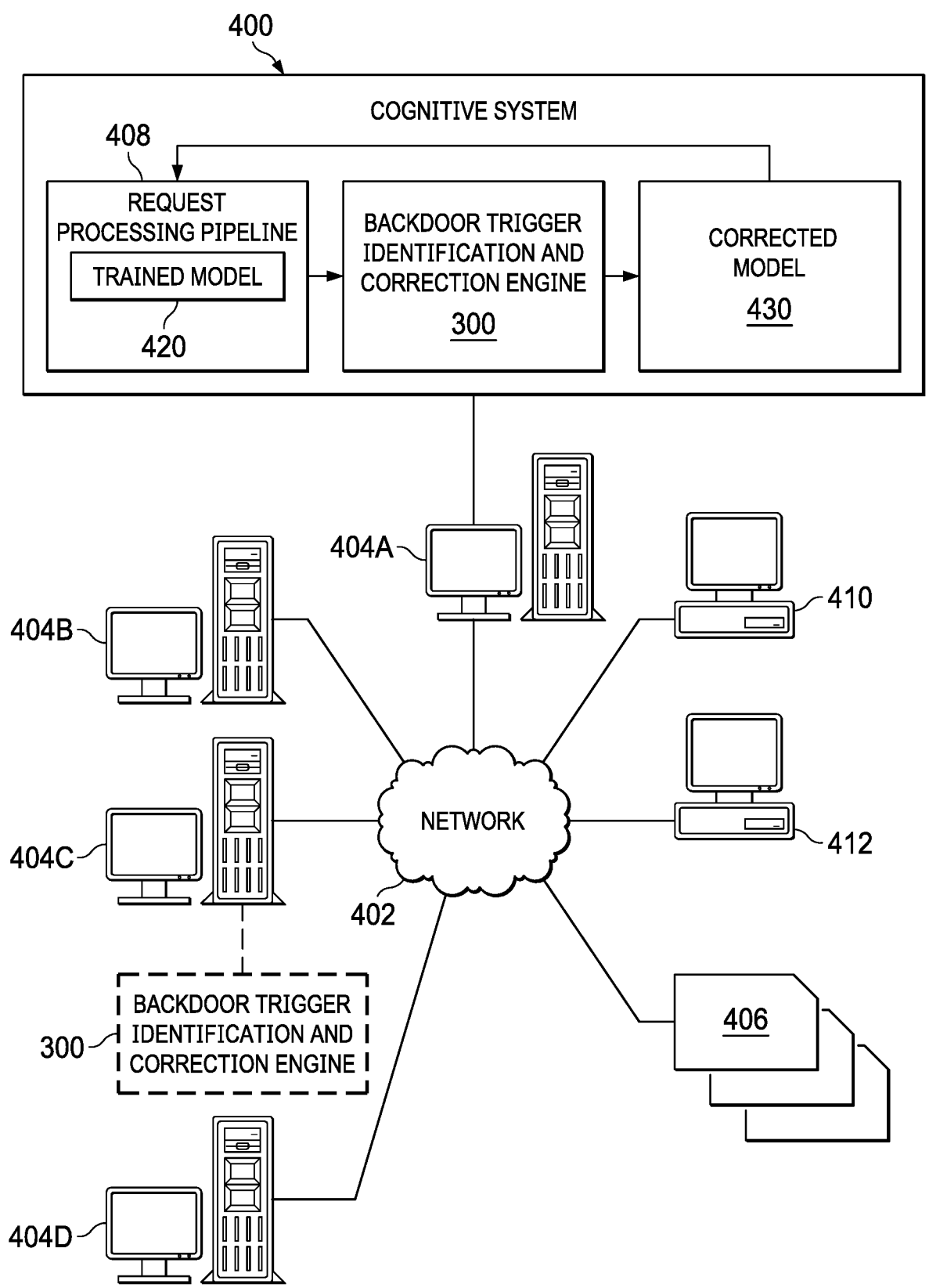
FIG. 4 depicts a schematic diagram of one illustrative embodiment of a cognitive system implementing a request processing pipeline in a computer network in accordance with one illustrative embodiment.
Figure 5:
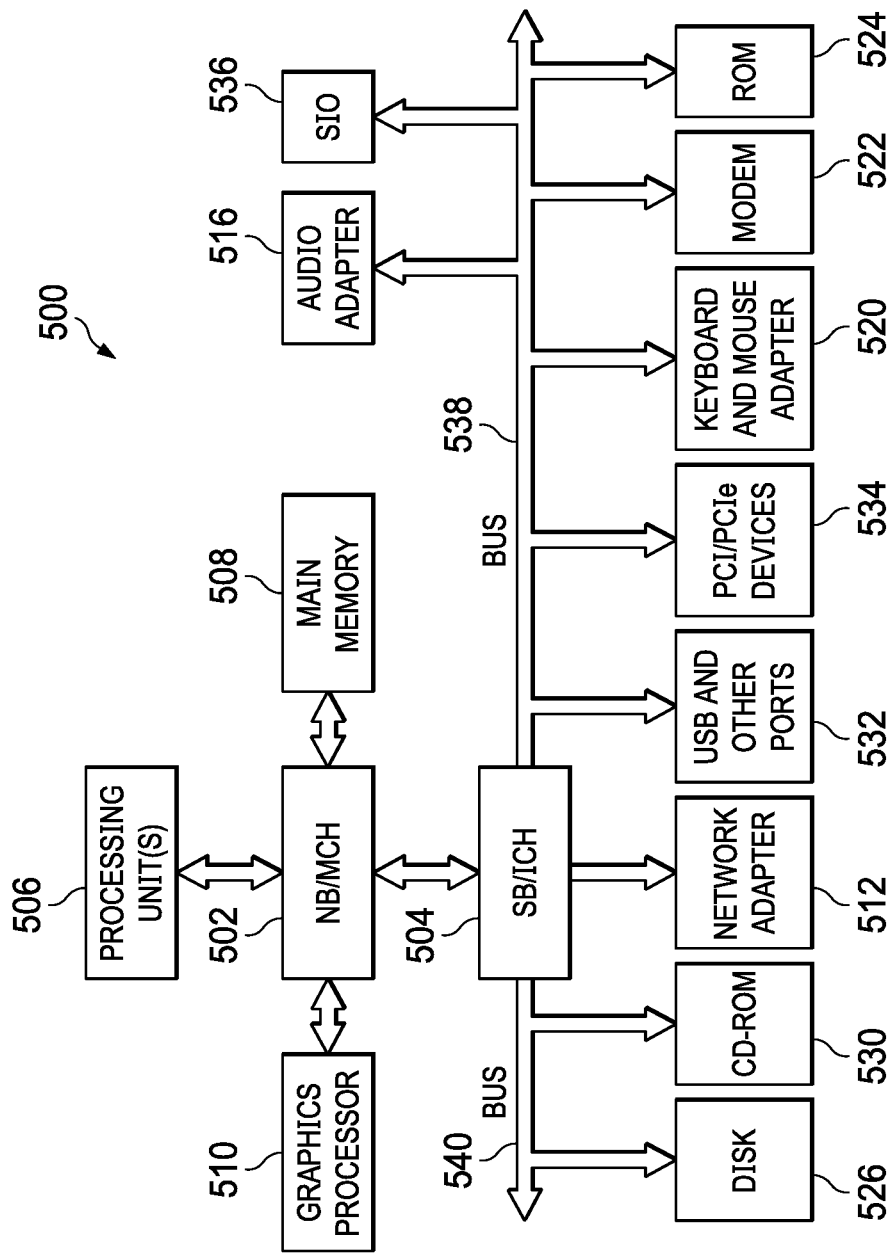
FIG. 5 is a block diagram of an example data processing system in which aspects of the illustrative embodiments are implemented.

FIGS. 4-5 are directed to describing an example cognitive system which implements a request processing pipeline, request processing methodology, and request processing computer program product with which the mechanisms of the illustrative embodiments are implemented. These requests may be provided as structured or unstructured request messages, natural language questions, or any other suitable format for requesting an operation to be performed by the cognitive system. In some illustrative embodiments, the requests may be in the form of input data sets that are to be classified in accordance with a cognitive classification operation performed by a machine learning, neural network, deep learning, or other artificial intelligence based model that is implemented by the cognitive system. The input data sets may represent various types of input data depending upon the particular implementation, such as audio input data, image input data, textual input data, or the like. For example, in one possible implementation, the input data set may represent a medical image, such as an x-ray image, CT scan image, MRI image, or the like, that is to have portions of the image, or the image as a whole, classified into one or more predefined classifications. In other possible implementations, the input data set may represent facial images, images of text, biometric images, natural language text content, or any other type of input that may be represented as data and for which a classification operation is to be performed so as to perform a cognitive operation by a cognitive system.

It should be appreciated that classification of input data may result in a labeled set of data that has labels or annotations representing the corresponding classes into which the non-labeled input data set is classified. This may be an intermediate step in performing other cognitive operations by the cognitive system that support decision making by human users, e.g., the cognitive system may be a decision support system. For example, in a medical domain, the cognitive system may operate to perform medical image analysis to identify anomalies for identification to a clinician, patient diagnosis and/or treatment recommendation, drug interaction analysis, or any of a plethora of other possible decision support operations. In a security domain, the cognitive system may operate to control access to physical premises, data assets, computing assets, or any other type of asset to which access is to be restricted. In other domains, the cognitive system may perform different types of decision making operations or decision support operations based on the desired implementation.

It should be appreciated that the cognitive system, while shown as having a single request processing pipeline in the examples hereafter, may in fact have multiple request processing pipelines. Each request processing pipeline may be separately trained and/or configured to process requests associated with different domains or be configured to perform the same or different analysis on input requests, depending on the desired implementation. For example, in some cases, a first request processing pipeline may be trained to operate on input requests directed to a medical image analysis, while a second request processing pipeline may be configured and trained to operate on input requests concerning patient electronic medical record (EMR) analysis involving natural language processing. In other cases, for example, the request processing pipelines may be configured to provide different types of cognitive functions or support different types of applications, such as one request processing pipeline being used for patient treatment recommendation generation, while another pipeline may be trained for financial industry based forecasting, etc.

Moreover, each request processing pipeline may have their own associated corpus or corpora that they ingest and operate on, e.g., one corpus for medical treatment documents and another corpus for financial industry domain related documents in the above examples. In some cases, the request processing pipelines may each operate on the same domain of input questions but may have different configurations, e.g., different annotators or differently trained annotators, such that different analysis and potential answers are generated. The cognitive system may provide additional logic for routing input questions to the appropriate request processing pipeline, such as based on a determined domain of the input request, combining and evaluating final results generated by the processing performed by multiple request processing pipelines, and other control and interaction logic that facilitates the utilization of multiple request processing pipelines.

One type of request processing pipeline with which the mechanisms of the illustrative embodiments may be utilized is a Question Answering (QA) pipeline. The description of example embodiments of the present invention hereafter will utilize a QA pipeline as an example of a request processing pipeline that may be augmented to include mechanisms in accordance with one or more illustrative embodiments. It should be appreciated that while the present invention will be described in the context of the cognitive system implementing one or more QA pipelines that operate on an input question, the illustrative embodiments are not limited to such. Rather, the mechanisms of the illustrative embodiments may operate on requests that are not posed as "questions" but are formatted as requests for the cognitive system to perform cognitive operations on a specified set of input data using the associated corpus or corpora and the specific configuration information used to configure the cognitive system. For example, rather than asking a natural language question of "What diagnosis applies to patient P?", the cognitive system may instead receive a request of "generate diagnosis for patient P," or the like. It should be appreciated that the mechanisms of the QA system pipeline may operate on requests in a similar manner to that of input natural language questions with minor modifications. In fact, in some cases, a request may be converted to a natural language question for processing by the QA system pipelines if desired for the particular implementation.

As will be discussed in greater detail hereafter, the illustrative embodiments may be integrated in, augment, and extend the functionality of these QA pipeline, or request processing pipeline, mechanisms to protect the models implemented in these pipelines, or by the cognitive system as a whole, from gradient based attacks, such as an evasion attack or the like. In particular, in portions of the cognitive system in which the trained neural network models, machine learning models, deep learning models, or the like, are employed to generate labeled data set outputs, the mechanisms of the illustrative embodiments may be implemented to train the neural network or other machine learning or cognitive model so as to introduce noise into the probability values generated by the trained neural network or model to thereby modify the loss surface of the neural network and make a correct gradient selection for generating an adversarial input difficult for an attacker.

As the mechanisms of the illustrative embodiments may be part of a cognitive system and may improve the operation of the cognitive system by identifying backdoor triggers that may be present in the trained models employed by the cognitive system and potentially correcting such models to eliminate these backdoor triggers, it is important to first have an understanding of how cognitive systems and question and answer creation in a cognitive system implementing a QA pipeline is implemented before describing how the mechanisms of the illustrative embodiments are integrated in and augment such cognitive systems and request processing pipeline, or QA pipeline, mechanisms. It should be appreciated that the mechanisms described in FIGS. 4-5 are only examples and are not intended to state or imply any limitation with regard to the type of cognitive system mechanisms with which the illustrative embodiments are implemented. Many modifications to the example cognitive system shown in FIGS. 4-5 may be implemented in various embodiments of the present invention without departing from the spirit and scope of the present invention.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. A cognitive system performs one or more computer-implemented cognitive operations that approximate a human thought process as well as enable people and machines to interact in a more natural manner so as to extend and magnify human expertise and cognition. A cognitive system comprises artificial intelligence logic, such as natural language processing (NLP) based logic, for example, and machine learning logic, which may be provided as specialized hardware, software executed on hardware, or any combination of specialized hardware and software executed on hardware.

This logic may implement one or more models, such as a neural network model, a machine learning model, a deep learning model, that may be trained for particular purposes for supporting the particular cognitive operations performed by the cognitive system. In accordance with the mechanisms of the illustrative embodiments, these models may be evaluated to identify whether or not the model has a backdoor trigger security vulnerability, generate appropriate notifications, and even possibly correct such security vulnerabilities by modifying the model, e.g., neural network, to provide a modified model that is not susceptible to the backdoor trigger security vulnerability. In this way, the model is hardened against security vulnerabilities.

The logic of the cognitive system implements the cognitive computing operation(s), examples of which include, but are not limited to, question answering, identification of related concepts within different portions of content in a corpus, security operations for controlling access to premises or assets, intelligent search algorithms, such as Internet web page searches, for example, medical diagnostic and treatment recommendations, other types of recommendation generation, e.g., items of interest to a particular user, potential new contact recommendations, etc., image analysis, audio analysis, and the like. The types and number of cognitive operations that may be implemented using the cognitive system of the illustrative embodiments are vast and cannot all be documented herein. Any cognitive computing operation emulating decision making and analysis performed by human beings, but in an artificial intelligence or cognitive computing manner, is intended to be within the spirit and scope of the present invention.

IBM Watson™ is an example of one such cognitive computing system which can process human readable language and identify inferences between text passages with human-like high accuracy at speeds far faster than human beings and on a larger scale. In general, such cognitive systems are able to perform the following functions:

Navigate the complexities of human language and understanding

Ingest and process vast amounts of structured and unstructured data

Generate and evaluate hypothesis

Weigh and evaluate responses that are based only on relevant evidence

Provide situation-specific advice, insights, and guidance

Improve knowledge and learn with each iteration and interaction through machine learning processes Enable decision making at the point of impact (contextual guidance)

Scale in proportion to the task

Extend and magnify human expertise and cognition

Identify resonating, human-like attributes and traits from natural language

Deduce various language specific or agnostic attributes from natural language

High degree of relevant recollection from data points (images, text, voice) (memorization and recall)

Predict and sense with situational awareness that mimic human cognition based on experiences Answer questions based on natural language and specific evidence In one aspect, cognitive computing systems (or simply "cognitive systems") provide mechanisms for answering questions posed to these cognitive systems using a Question Answering pipeline or system (QA system) and/or process requests which may or may not be posed as natural language questions. The QA pipeline or system is an artificial intelligence application executing on data processing hardware that answers questions pertaining to a given subject-matter domain presented in natural language. The QA pipeline receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA pipeline. The document may include any file, text, article, or source of data for use in the QA system. For example, a QA pipeline accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input questions to cognitive system which implements the QA pipeline. The QA pipeline then answers the input questions using the content in the corpus of data by evaluating documents, sections of documents, portions of data in the corpus, or the like. When a process evaluates a given section of a document for semantic content, the process can use a variety of conventions to query such document from the QA pipeline, e.g., sending the query to the QA pipeline as a well-formed question which is then interpreted by the QA pipeline and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

The QA pipeline receives an input question, parses the question to extract the major features of the question, uses the extracted features to formulate queries, and then applies those queries to the corpus of data. Based on the application of the queries to the corpus of data, the QA pipeline generates a set of hypotheses, or candidate answers to the input question, by looking across the corpus of data for portions of the corpus of data that have some potential for containing a valuable response to the input question. The QA pipeline then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA pipeline. The statistical model is used to summarize a level of confidence that the QA pipeline has regarding the evidence that the potential response, i.e. candidate answer, is inferred by the question. This process is repeated for each of the candidate answers until the QA pipeline identifies candidate answers that surface as being significantly stronger than others and thus, generates a final answer, or ranked set of answers, for the input question.

FIG. 4 depicts a schematic diagram of one illustrative embodiment of a cognitive system 400 implementing a request processing pipeline 408, which in some embodiments may be a question answering (QA) pipeline, in a computer network 402. For purposes of the present description, it will be assumed that the request processing pipeline 408 is implemented as a QA pipeline that operates on structured and/or unstructured requests in the form of input questions. One example of a question processing operation which may be used in conjunction with the principles described herein is described in U.S. Patent Application Publication No. 2011/0125734, which is herein incorporated by reference in its entirety. The cognitive system 400 is implemented on one or more computing devices 404A-D (comprising one or more processors and one or more memories, and potentially any other computing device elements generally known in the art including buses, storage devices, communication interfaces, and the like) connected to the computer network 402. For purposes of illustration only, FIG. 4 depicts the cognitive system 400 being implemented on computing device 404A only, but as noted above the cognitive system 400 may be distributed across multiple computing devices, such as a plurality of computing devices 404A-D. The network 402 includes multiple computing devices 404A-D, which may operate as server computing devices, and 410-412 which may operate as client computing devices, in communication with each other and with other devices or components via one or more wired and/or wireless data communication links, where each communication link comprises one or more of wires, routers, switches, transmitters, receivers, or the like. In some illustrative embodiments, the cognitive system 400 and network 402 enables question processing and answer generation (QA) functionality for one or more cognitive system users via their respective computing devices 410-412. In other embodiments, the cognitive system 400 and network 402 may provide other types of cognitive operations including, but not limited to, request processing and cognitive response generation which may take many different forms depending upon the desired implementation, e.g., cognitive information retrieval, training/instruction of users, cognitive evaluation of data, or the like. Other embodiments of the cognitive system 400 may be used with components, systems, subsystems, and/or devices other than those that are depicted herein.

The cognitive system 400 is configured to implement a request processing pipeline 408 that receive inputs from various sources. The requests may be posed in the form of a natural language question, natural language request for information, natural language request for the performance of a cognitive operation, or the like. Alternatively, the "request" may simply be the input of data that is intended to be operated on by the cognitive system, e.g., images, text, audio input, or the like, which is to be classified by the hardened model of the illustrative embodiments and then operated on by cognitive processes to generate a result of a cognitive operation. For example, the cognitive system 400 receives input from the network 402, a corpus or corpora of electronic documents 406, cognitive system users, image capture devices, audio capture devices, biometric scanners, textual message interception devices, and/or other data sources and other possible sources of input. It should be appreciated that while the input data may be referred to herein as "documents", the input data may be of various types including audio data, image data, graphical data, textual data, or any combination of two or more of these without departing from the spirit and scope of the present invention. Thus, a "document" may in fact be an image represented as a data file, for example.

In one embodiment, some or all of the inputs to the cognitive system 400 are routed through the network 402. The various computing devices 404A-D on the network 402 include access points for content creators and cognitive system users. Some of the computing devices 404A-D include devices for a database storing the corpus or corpora of data 406 (which is shown as a separate entity in FIG. 4 for illustrative purposes only). Portions of the corpus or corpora of data 406 may also be provided on one or more other network attached storage devices, in one or more databases, or other computing devices not explicitly shown in FIG. 4. The network 402 includes local network connections and remote connections in various embodiments, such that the cognitive system 400 may operate in environments of any size, including local and global, e.g., the Internet.

Depending on the particular domain and implementation of the cognitive system, the corpus or corpora of data 406 may take many different forms. In a natural language implementation, the corpus or corpora 406 may be composed of natural language unstructured documents, structured documents, or the like. In a domain in which image analysis is being performed, the corpus or corpora 406 may include image data for various types of entities. In an audio analysis domain, the corpus or corpora 406 may contain audio patterns representing different entities or sources of audible sounds. The content of the corpus or corpora 406 may vary depending on the type of data needed to perform cognitive operations.

In one embodiment, the content creator, which may be a human being or an automated computing system, for example, creates content in a document of the corpus or corpora of data 406 for use as part of a corpus of data with the cognitive system 400. The document includes any file, text, article, or source of data for use in the cognitive system 400. For example, in accordance with one illustrative embodiment, the document may be one or more digital images that are to be processed via the cognitive system and trained machine learning or cognitive models to identify elements of the images and classify them for purposes of performing subsequent cognitive operations by the cognitive system. In other illustrative embodiments, the document may comprise other data, e.g., audio, textual, graphical, etc., that may be processed via such machine learning or cognitive models.

Cognitive system users access the cognitive system 400 via a network connection or an Internet connection to the network 402, and input questions/requests to the cognitive system 400 that are answered/processed based on the content in the corpus or corpora of data 406. In one embodiment, the questions/requests are formed using natural language. The cognitive system 400 parses and interprets the question/request via a pipeline 408, and provides a response to the cognitive system user, e.g., cognitive system user 410, containing one or more answers to the question posed, response to the request, results of processing the request, or the like. In some embodiments, the cognitive system 400 provides a response to users in a ranked list of candidate answers/responses while in other illustrative embodiments, the cognitive system 400 provides a single final answer/response or a combination of a final answer/response and ranked listing of other candidate answers/responses.

The cognitive system 400 implements the pipeline 408 which comprises a plurality of stages for processing an input question/request based on information obtained from the corpus or corpora of data 406. The pipeline 408 generates answers/responses for the input question or request based on the processing of the input question/request and the corpus or corpora of data 406.

In some illustrative embodiments, the cognitive system 400 may be the IBM Watson™ cognitive system available from International Business Machines Corporation of Armonk, N.Y., which may operate based on processing data performed by one or more machine learning models or cognitive models, such as neural networks or the like. For example, the machine learning or cognitive models may operate to classify input data into one or more of a plurality of classes which provides input to the cognitive system to facilitate the performance of a cognitive evaluation and corresponding operation. For example, in the case of an image analysis component of a treatment recommendation cognitive system, the models may be used to classify anatomical structures in medical images and the identification of such anatomical structures may be used by the cognitive system to evaluate a medical condition of a patient and a corresponding treatment to recommend to a medical professional. As noted above, the models may be susceptible to backdoor trigger security vulnerabilities that may be identified by the mechanisms of the illustrative embodiments, may be notified to authorized personnel, and may be automatically corrected in the models to thereby harden the models against such vulnerabilities.

As noted above, while the input to the cognitive system 400 from a client device may be posed in the form of a natural language question, the illustrative embodiments are not limited to such. Rather, the input question may in fact be formatted or structured as any suitable type of request, or simply as a set of input data to be processed, which may be parsed and analyzed using structured and/or unstructured input analysis, including but not limited to the natural language parsing and analysis mechanisms of a cognitive system such as IBM Watson™, to determine the basis upon which to perform cognitive analysis and providing a result of the cognitive analysis. Such processing may alternatively, or in addition, include image analysis, audio analysis, textual image analysis, biometrics analysis, or any other type of cognitive analysis that utilizes neural network, machine learning, or other cognitive models which may be trained and hardened against gradient based attacks in accordance with the illustrative embodiments.

Regardless of the manner by which the question or request is input to the cognitive system 300, as mentioned previously, the processing of the request or question involves the application of a trained model 420, e.g., neural network model, machine learning model, deep learning (cognitive) model, etc., to an input data set as described previously above. This input data set may represent features of the actual request or question itself, data submitted along with the request or question upon which processing is to be performed, and/or the like. The application of the trained model 420 to an input data set may occur at various points during the performance of the cognitive computing operations by the cognitive system. For example, the trained model 420 may be utilized during feature extraction and classification by a feature extraction stage of processing of the request or input question, e.g., taking a natural language term in the request or question and classifying it as one of a plurality of possible concepts that the term corresponds to, e.g., classifying the term "truck" in an input question or request into a plurality of possible classes, one of which may be "vehicle". As another example, a portion of an image comprising a plurality of pixel data may have the trained model applied to it to determine what the object is that is in the portion of the image. The mechanisms of the illustrative embodiments operate on the output of the trained model 420 as discussed previously above, which may be an intermediate operation within the overall cognitive system's cognitive computing operations, e.g., classification of a portion of a medical image into one of a plurality of different anatomical structures may be an intermediate operation to performing an anomaly identification and treatment recommendation cognitive computing operation.

It should be further noted that while a single trained model 420 is depicted in FIG. 4, the request processing pipeline 408 may in fact utilize a plurality of different trained models, or instances of the same trained model, to facilitate performing cognitive operations. The mechanisms of the illustrative embodiments for identifying backdoor triggers in trained models may be implemented with regard to one or more of the models implemented in the request processing pipeline(s) 408 of the cognitive system 400. Moreover, while FIG. 4 shows the trained model 420 as being an element of the request processing pipeline 408, the trained model 420 may in fact be a separate element from the request processing pipeline 408 but which may be accessed by the request processing pipeline 408 or otherwise receives the results of processing by the trained model 420 for use in performing cognitive operations.

The model(s) 420 implemented in the cognitive system 400 may be evaluated by the backdoor trigger identification and correction system 300 to determine if they have any backdoor triggers that were introduced during training of the models. The backdoor trigger identification and correction system 300 may implemented in the same or different computing systems, e.g., servers, as the cognitive system 400. In some embodiments, the backdoor trigger identification and correction system 300 may be implemented as part of the cognitive system 400, such as a subsystem within the cognitive system 400 which may evaluate models before they are integrated into the implementation of the cognitive system 400, such as part of a model validation or verification operation performed prior to the models being deployed in the cognitive system 400.

The backdoor trigger identification and correction system 300 may generate a corrected model 430 which may be used to replace the original trained model 420 in the event that a backdoor trigger is identified as being present within the original trained model 420. As discussed previously, the corrected model 430 is a version of the original trained model 420 which has been retrained using a relatively small number of epochs of training using an adversarial training dataset generated by introducing the detected backdoor trigger into a portion of a test dataset and re-training the original trained model 420 to correctly classify the modified test dataset having the backdoor trigger, regardless of the fact that the backdoor trigger is present in the modified test dataset. This effectively eliminates the detected backdoor trigger from the model and generates a corrected model 430 which may be used to replace the original trained model 420.

It should be appreciated that while FIG. 4 illustrates the implementation of the model 420 and backdoor trigger identification and correction engine 300 as part of a cognitive system 400, the illustrative embodiments are not limited to such. Rather, in some illustrative embodiments, the trained model 420 and/or the backdoor trigger identification and correction engine 300 may be provided as a service from which a user of a client computing device 410, may request processing of an input data set and/or verification or validation of a trained model. Moreover, other providers of services, which may include other cognitive systems, may utilize such a trained model 420 and/or backdoor trigger identification and correction engine 300 to augment the operation of their own cognitive systems. Thus, in some illustrative embodiments the trained model 420 and/or backdoor trigger identification and correction engine 300 may be implemented in one or more server computing devices, accessed via one or more APIs via other computing devices through which input data sets are submitted to the trained model 420, and corresponding labeled data sets are returned, and through which a trained model may be provided to the backdoor trigger identification and correction engine 300, and a notification/log of whether or not a backdoor trigger is identified in the trained model and/or a corrected model may be returned. Thus, the integration of the mechanisms of the illustrative embodiments into a cognitive system 400 is not required, but may be performed depending on the desired implementation.

As noted above, the mechanisms of the illustrative embodiments are rooted in the computer technology arts and are implemented using logic present in such computing or data processing systems. These computing or data processing systems are specifically configured, either through hardware, software, or a combination of hardware and software, to implement the various operations described above. Such specific configuration transforms the computing or data processing systems into specifically configured computing or data processing systems that perform non-generic computing functions specific to one or more of the illustrative embodiments as discussed above. As such, FIG. 5 is provided as an example of one type of data processing system in which aspects of the present invention may be implemented. Many other types of data processing systems may be likewise configured to specifically implement the mechanisms of the illustrative embodiments.

FIG. 5 is a block diagram of an example data processing system in which aspects of the illustrative embodiments are implemented. Data processing system 500 is an example of a computer, such as server computing device 404 or client computing device 410 in FIG. 4, in which computer usable code or instructions implementing the processes for illustrative embodiments of the present invention are located. In one illustrative embodiment, FIG. 5 represents a server computing device, such as a server 404A, which implements a cognitive system 400 and request or QA system pipeline 408 whose models may be evaluated for backdoor triggers and may be corrected to eliminate backdoor triggers by a backdoor trigger identification and correction engine. Such a backdoor trigger identification and correction engine may be implemented in the same data processing system 500 or a similar data processing system separately provided.

In the depicted example, data processing system 500 employs a hub architecture including north bridge and memory controller hub (NB/MCH) 502 and south bridge and input/output (I/O) controller hub (SB/ICH) 504. Processing unit 506, main memory 508, and graphics processor 510 are connected to NB/MCH 502. Graphics processor 510 is connected to NB/MCH 502 through an accelerated graphics port (AGP).

In the depicted example, local area network (LAN) adapter 512 connects to SB/ICH 504. Audio adapter 516, keyboard and mouse adapter 520, modem 522, read only memory (ROM) 524, hard disk drive (HDD) 526, CD-ROM drive 530, universal serial bus (USB) ports and other communication ports 532, and PCI/PCIe devices 534 connect to SB/ICH 504 through bus 538 and bus 540. PCI/PCIe devices may include, for example, Ethernet adapters, add-in cards, and PC cards for notebook computers. PCI uses a card bus controller, while PCIe does not. ROM 524 may be, for example, a flash basic input/output system (BIOS).

HDD 526 and CD-ROM drive 530 connect to SB/ICH 504 through bus 540. HDD 526 and CD-ROM drive 530 may use, for example, an integrated drive electronics (IDE) or serial advanced technology attachment (SATA) interface. Super I/O (SIO) device 536 is connected to SB/ICH 504.

An operating system runs on processing unit 506. The operating system coordinates and provides control of various components within the data processing system 500 in FIG. 5. As a client, the operating system is a commercially available operating system such as Microsoft® Windows 10®. An object-oriented programming system, such as the Java™ programming system, may run in conjunction with the operating system and provides calls to the operating system from Java™ programs or applications executing on data processing system 500.

As a server, data processing system 500 may be, for example, an IBM® eServer™ System p® computer system, running the Advanced Interactive Executive) (AIX®) operating system or the LINUX® operating system. Data processing system 500 may be a symmetric multiprocessor (SMP) system including a plurality of processors in processing unit 506. Alternatively, a single processor system may be employed.

Instructions for the operating system, the object-oriented programming system, and applications or programs are located on storage devices, such as HDD 526, and are loaded into main memory 508 for execution by processing unit 506. The processes for illustrative embodiments of the present invention are performed by processing unit 506 using computer usable program code, which is located in a memory such as, for example, main memory 508, ROM 524, or in one or more peripheral devices 526 and 530, for example.

A bus system, such as bus 538 or bus 540 as shown in FIG. 5, is comprised of one or more buses. Of course, the bus system may be implemented using any type of communication fabric or architecture that provides for a transfer of data between different components or devices attached to the fabric or architecture. A communication unit, such as modem 522 or network adapter 512 of FIG. 5, includes one or more devices used to transmit and receive data. A memory may be, for example, main memory 508, ROM 524, or a cache such as found in NB/MCH 502 in FIG. 5.

Those of ordinary skill in the art will appreciate that the hardware depicted in FIGS. 4 and 5 may vary depending on the implementation. Other internal hardware or peripheral devices, such as flash memory, equivalent non-volatile memory, or optical disk drives and the like, may be used in addition to or in place of the hardware depicted in FIGS. 4 and 5. Also, the processes of the illustrative embodiments may be applied to a multiprocessor data processing system, other than the SMP system mentioned previously, without departing from the spirit and scope of the present invention.

Moreover, the data processing system 500 may take the form of any of a number of different data processing systems including client computing devices, server computing devices, a tablet computer, laptop computer, telephone or other communication device, a personal digital assistant (PDA), or the like. In some illustrative examples, data processing system 500 may be a portable computing device that is configured with flash memory to provide non-volatile memory for storing operating system files and/or user-generated data, for example. Essentially, data processing system 500 may be any known or later developed data processing system without architectural limitation.

Figure 6:
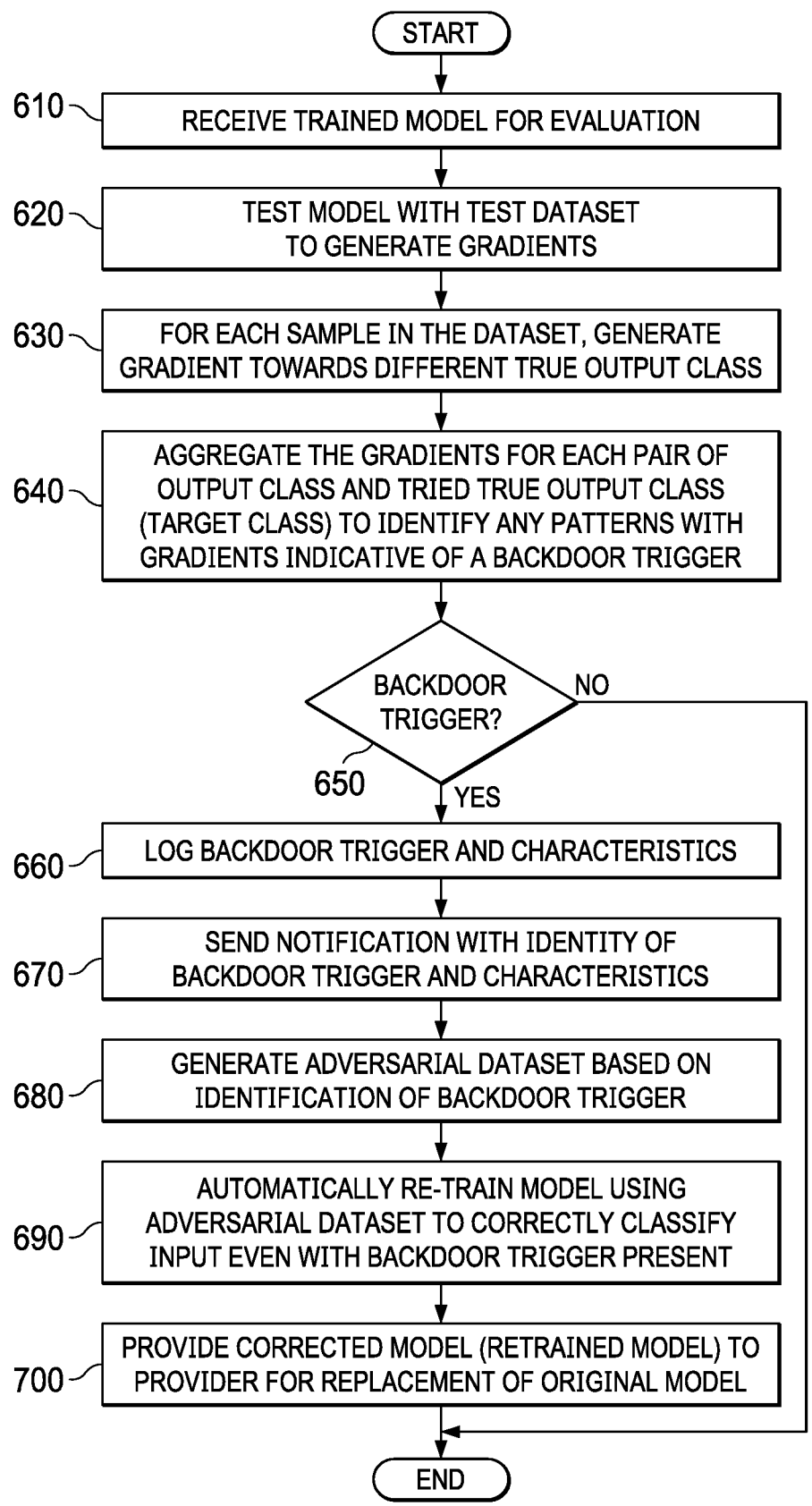
FIG. 6 is a flowchart outlining an example operation for identifying and correcting a backdoor trigger present in a trained model in accordance with one illustrative embodiment.

FIG. 6 is a flowchart outlining an example operation for identifying and correcting a backdoor trigger present in a trained model, such as a machine learning or cognitive model, in accordance with one illustrative embodiment. As shown in FIG. 6, the operation starts by receiving a trained model for evaluation (step 610). A test dataset is input to the trained model to generate gradients (step 620). For each sample in the test dataset, a gradient towards the true output class is generated (step 630). The gradients are aggregated for each pair of output class and tried true output class (or target class) to identify any patterns with gradients indicative of a backdoor trigger (step 640). A determination is made as to whether or not there is a backdoor trigger present in the trained model based on the results of the analysis of the aggregated gradients (step 650). If not, the operation terminates. If there is a backdoor trigger present, the backdoor trigger is logged in a log data structure along with characteristics of the backdoor trigger including, but not limited to, the type of backdoor trigger, e.g., single pixel, pixel pattern, or the like, the classes affected, location of the backdoor trigger within the input image, etc. (step 660). In addition, or alternatively, a notification is sent to an authorized user indicating the detection of the backdoor trigger and its characteristics (step 670).

Moreover, in some illustrative embodiments, the detected backdoor trigger and its characteristics are utilized along with the test dataset to generate an adversarial dataset comprising at least a portion of the test dataset in which input data is modified to include the backdoor trigger, e.g., input images in the test dataset are modified to include the single pixel, pixel pattern, etc., backdoor trigger identified by the illustrative embodiment (step 680). The received model is then automatically re-trained using the adversarial dataset to properly classify the modified input into the correct class output rather than the misclassified output class (step 690). The re-trained model is then provided to the provider of the original model for replacement of the original model (step 700). The operation then terminates.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and a memory, the memory comprising instructions which are executed by the processor to specifically configure the processor to implement a backdoor trigger identification engine, for evaluating a trained machine learning model to determine whether the machine learning model has a backdoor trigger, the method comprising:

processing, by the trained machine learning model, a test dataset to generate output classifications for the test dataset;

generating, by the backdoor trigger identification engine, for the test dataset, gradient data indicating a degree of change of elements within the test dataset based on the output generated by processing the test dataset;

analyzing, by the backdoor trigger identification engine, the gradient data to identify a pattern of elements within the test dataset indicative of a backdoor trigger; and generating, by the backdoor trigger identification engine, in response to the analysis identifying the pattern of elements indicative of a backdoor trigger, an output indicating the existence of the backdoor trigger in the trained machine learning model.

2. The method of claim 1, wherein the test dataset comprises a plurality of digital images, and wherein a sub-portion of the test dataset comprises one or more digital images having a portion of the digital images that comprises a characteristic triggering a misclassification, by the trained machine learning model, of at least one object in the digital image into an incorrect class in the output classifications.

3. The method of claim 2, wherein the portion of the digital images is one of a single pixel or a pattern of pixels having at least one characteristic that causes the misclassification of the at least one object.

4. The method of claim 1, wherein the gradient data is generated by computing a gradient of a loss function of the trained machine learning model with respect to each component of the test dataset.

5. The method of claim 1, wherein generating, for the test dataset, gradient data indicating a degree of change of elements within the test dataset further comprises introducing noise into the test dataset to mask features causing legitimate changes in the gradient data.

6. The method of claim 1, further comprising:
retraining the machine learning model based on the identified backdoor trigger to cause the machine learning model to correctly classify portions of datasets that include the backdoor trigger into a correct classification.

7. The method of claim 6, wherein retraining the machine learning model comprises training the machine learning model on a new training data set with the backdoor trigger inserted into the new training data set.

8. The method of claim 1, wherein analyzing, by the backdoor trigger identification engine, the gradient data to identify a pattern of elements indicative of a backdoor trigger comprises automatically analyzing, by an anomaly detection algorithm or strength comparison algorithm, the gradient data to identify the pattern of elements indicative of the backdoor trigger.

9. The method of claim 1, wherein generating, in response to the analysis identifying the pattern of elements indicative of a backdoor trigger, an output indicating the existence of the backdoor trigger in the trained machine learning model comprises at least one of logging the existence of the backdoor trigger in an entry of a log data structure or sending a notification message to an authorized user, wherein either the log data structure or notification message comprises an identity of the backdoor trigger, the output classifications associated with the backdoor trigger, and characteristics of the backdoor trigger.

10. The method of claim 1, wherein the machine learning model is a convolutional neural network.

11. A computer program product comprising a computer readable storage medium having a computer readable program stored therein, wherein the computer readable program, when executed on a data processing system, causes the data processing system to implement a backdoor trigger identification engine, for evaluating a trained machine learning model to determine whether the machine learning model has a backdoor trigger, wherein the data processing system operates to:

process, by the trained machine learning model, a test dataset to generate output classifications for the test dataset;

generate, by the backdoor trigger identification engine, for the test dataset, gradient data indicating a degree of change of elements within the test dataset based on the output generated by processing the test dataset;

analyze, by the backdoor trigger identification engine, the gradient data to identify a pattern of elements within the test dataset indicative of a backdoor trigger; and generate, by the backdoor trigger identification engine, in response to the analysis identifying the pattern of elements indicative of a backdoor trigger, an output indicating the existence of the backdoor trigger in the trained machine learning model.

12. The computer program product of claim 11, wherein the test dataset comprises a plurality of digital images, and wherein a sub-portion of the test dataset comprises one or more digital images having a portion of the digital images that comprises a characteristic triggering a misclassification, by the trained machine learning model, of at least one object in the digital image into an incorrect class in the output classifications.

13. The computer program product of claim 12, wherein the portion of the digital images is one of a single pixel or a pattern of pixels having at least one characteristic that causes the misclassification of the at least one object.

14. The computer program product of claim 11, wherein the gradient data is generated at least by computing a gradient of a loss function of the trained machine learning model with respect to each component of the test dataset.

15. The computer program product of claim 11, wherein the computer readable program further causes the data processing system to generate, for the test dataset, gradient data indicating a degree of change of elements within the test dataset further at least by introducing noise into the test dataset to mask features causing legitimate changes in the gradient data.

16. The computer program product of claim 11, wherein the computer readable program further causes the data processing system to:
retrain the machine learning model based on the identified backdoor trigger to cause the machine learning model to correctly classify portions of datasets that include the backdoor trigger into a correct classification.

17. The computer program product of claim 16, wherein retraining the machine learning model comprises training the machine learning model on a new training data set with the backdoor trigger inserted into the new training data set.

18. The computer program product of claim 11, wherein the computer readable program further causes the data processing system to analyze, by the backdoor trigger identification engine, the gradient data to identify a pattern of elements indicative of a backdoor trigger at least by automatically analyzing, by an anomaly detection algorithm or strength comparison algorithm, the gradient data to identify the pattern of elements indicative of the backdoor trigger.

19. The computer program product of claim 11, wherein the computer readable program further causes the data processing system to generate, in response to the analysis identifying the pattern of elements indicative of a backdoor trigger, an output indicating the existence of the backdoor trigger in the trained machine learning model comprising at least one of logging the existence of the backdoor trigger in an entry of a log data structure or sending a notification message to an authorized user, wherein either the log data structure or notification message comprises an identity of the backdoor trigger, the output classifications associated with the backdoor trigger, and characteristics of the backdoor trigger.

20. An apparatus comprising:
   at least one processor; and
   at least one memory coupled to the at least one processor, wherein the at least one memory comprises instructions which, when executed by the at least one processor, cause the at least one processor to implement a backdoor trigger identification engine, for evaluating a trained machine learning model to determine whether the machine learning model has a backdoor trigger, wherein the processor operates to:
   process, by the trained machine learning model, a test dataset to generate output classifications for the test dataset;
   generate, by the backdoor trigger identification engine, for the test dataset, gradient data indicating a degree of change of elements within the test dataset based on the output generated by processing the test dataset;
   analyze, by the backdoor trigger identification engine, the gradient data to identify a pattern of elements within the test dataset indicative of a backdoor trigger; and
   generate, by the backdoor trigger identification engine, in response to the analysis identifying the pattern of elements indicative of a backdoor trigger, an output indicating the existence of the backdoor trigger in the trained machine learning model.

* * * * *